United States Patent
Liberatore

(10) Patent No.: US 8,346,414 B2
(45) Date of Patent: Jan. 1, 2013

(54) SYSTEM AND METHOD FOR DETERMINING WHETHER A LOCOMOTIVE IN A CONSIST IS IN LEADING MODE OR TRAILING MODE

(75) Inventor: Aldo Liberatore, London (CA)

(73) Assignee: ZTR Control Systems, London (CA)

( * ) Notice: Subject to any disclaimer, the term of this patent is extended or adjusted under 35 U.S.C. 154(b) by 483 days.

(21) Appl. No.: 12/721,717

(22) Filed: Mar. 11, 2010

(65) Prior Publication Data

US 2010/0256842 A1 Oct. 7, 2010

Related U.S. Application Data

(60) Provisional application No. 61/160,379, filed on Mar. 16, 2009.

(51) Int. Cl.
*G06F 7/00* (2006.01)
(52) U.S. Cl. ............................. 701/19; 701/36
(58) Field of Classification Search ................ 701/19, 701/20, 36, 70; 303/7, 8; 246/167
See application file for complete search history.

(56) References Cited

U.S. PATENT DOCUMENTS

| | | | |
|---|---|---|---|
| 4,830,437 A | | 5/1989 | Rumsey |
| 5,104,203 A | * | 4/1992 | Ferri ............................... 303/15 |
| 5,172,316 A | * | 12/1992 | Root et al. ..................... 701/70 |
| 6,249,722 B1 | * | 6/2001 | Balukin et al. ................. 701/19 |
| 6,401,015 B1 | * | 6/2002 | Stewart et al. ................. 701/19 |

* cited by examiner

*Primary Examiner* — Richard M. Camby
(74) *Attorney, Agent, or Firm* — Brett J. Slaney; Blake, Cassels & Graydon LLP

(57) ABSTRACT

By taking a pressure reading at a particular port on a multiple-unit braking valve, e.g. the MU-2-A valve, and comparing such a reading to a main reservoir pressure, one can identify whether the locomotive in which the valve is situated is in trailing mode or leading mode. In particular, it was found that the pressure on port 63 of the MU-2-A valve is indicative of which mode the locomotive is in since port 63 is exhausted to atmosphere in lead mode whereas it is at or near the pressure in the main reservoir which is readily distinguishable from atmosphere.

22 Claims, 12 Drawing Sheets

SYSTEM AND METHOD FOR DETERMINING WHETHER A LOCOMOTIVE IN A CONSIST IS IN LEADING MODE OR TRAILING MODE

This application claims priority from U.S. Provisional Patent Application No. 61/160,379 filed on Mar. 16, 2009, the contents of which are incorporated herein by reference.

TECHNICAL FIELD

The following relates generally to locomotive braking systems, and in particular to determining whether a locomotive in a consist is in leading mode or trailing mode.

BACKGROUND

The Association of American Railroads (AAR) is an organization that oversees North American rail networks and sets new standards for innovation, safety, and technology in the rail industry. Changes to the AAR standard regulating the design of Automatic Engine Shutdown and Start devices (S-5502) have been contemplated and proposed. Such changes would dictate that all systems installed after Jul. 1, 2009 adopt new shutdown and restart algorithms accounting for the locomotive being in either the trail or lead position. The intent would be to allow the locomotive to stay shutdown for longer periods of time if it is, e.g., in a yard and in trail position and simply being moved by a lead locomotive.

Locomotives less than 10 years old and being built today will typically be equipped with electronic air brakes (EAB) from which the lead/trail status of the locomotive can be acquired through the air brake's communication port, which is continuously being monitored by the locomotive's controlling computer.

However, older locomotives and their completely pneumatic air brake controls do not have that capability. One option for dealing with the older locomotives, which has been discussed in the industry, includes measuring the pressure of the locomotive's equalizing reservoir, which should always read zero (0) PSI (i.e. exhausted to atmosphere) when the locomotive is in the trail position. When the locomotive is not in the trail position, equalizing reservoir pressure is controlled by the brake handle and while it should only go to zero (0) in the event of an emergency brake application, it may get close. This has the potential to cause an erroneous reading based on the sensing application, its accuracy, and its measurement hysteresis.

Therefore, there exists a need to accurately and consistently determine whether a locomotive in a consist is in leading mode or trailing mode.

SUMMARY OF THE INVENTION

In one aspect, there is provided a system for determining whether a locomotive in a consist is in a leading mode or a trailing mode, the system comprising: a first fluidly communicative connection to port 63 of an MU-2-A valve on the locomotive; a pressure measurement device in communication with the first fluidly communicative connection for obtaining a pressure measurement at the port 63, wherein a comparison of the pressure measurement at the port 63 to a value associated with a main reservoir pressure is indicative of whether the locomotive is in the leading mode or the trailing mode.

In another aspect, there is provided a method for determining whether a locomotive in a consist is in a leading mode or a trailing mode, the method comprising: obtaining a first pressure measurement indicative of pressure at port 63 on an MU-2-A valve of the locomotive; comparing the first pressure measurement to a value associated with the main reservoir pressure; and using the comparison to provide an output indicative of whether the locomotive is in the leading mode or the trailing mode.

In yet another aspect, there is provided a method for retrofitting an existing locomotive configured to be used in a consist for determining whether the locomotive is in a leading mode or a trailing mode, the method comprising: providing a first fluidly communicative connection to port 63 of an MU-2-A valve on the locomotive; providing a pressure measurement device in communication with the first fluidly communicative connection for obtaining a pressure measurement at the port 63; and obtaining an output provided by the pressure measurement device indicative of the pressure measurement at the port 63 to enable comparison of the pressure measurement to a value associated with a main reservoir pressure.

BRIEF DESCRIPTION OF THE DRAWINGS

Embodiments will now be described by way of example only with reference to the appended drawings wherein.

DETAILED DESCRIPTION OF THE DRAWINGS

By taking a pressure reading at a particular port on a multiple-unit braking valve, e.g. the MU-2-A valve, and comparing such a reading to a main reservoir pressure, one can identify whether the locomotive in which the valve is situated is in trailing mode or leading mode. In particular, it was found that the pressure on port 63 of the MU-2-A valve is indicative of which mode the locomotive is in since port 63 is exhausted to atmosphere in lead mode whereas it is at or near the pressure in the main reservoir in trail mode, which is readily distinguishable from atmosphere.

It has been recognized that since in either trail position, the pressure at port 63 on an MU-2-A valve is substantially if not exactly equal to the main reservoir air pressure, a determination of the pressure at port 63 can indicate whether or not the locomotive is in trail or lead position. The determination can be based on a pressure measurement and comparison of such a reading to knowledge of what the pressure reading should be in the trail or lead position; or, as will be exemplified herein, by activating a pressure switch having particular set points that indicates which position the MU-2-A valve is in.

Figure 1:
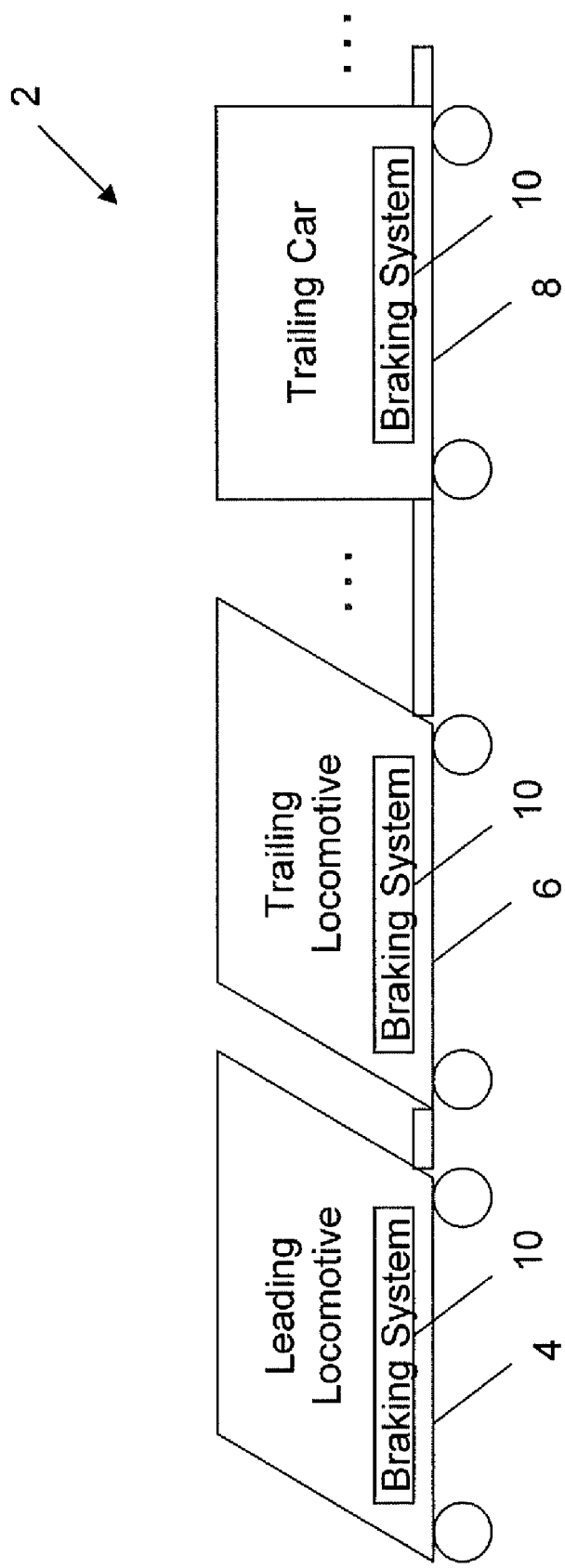
FIG. 1 is a block diagram of a train.
Figure 2:
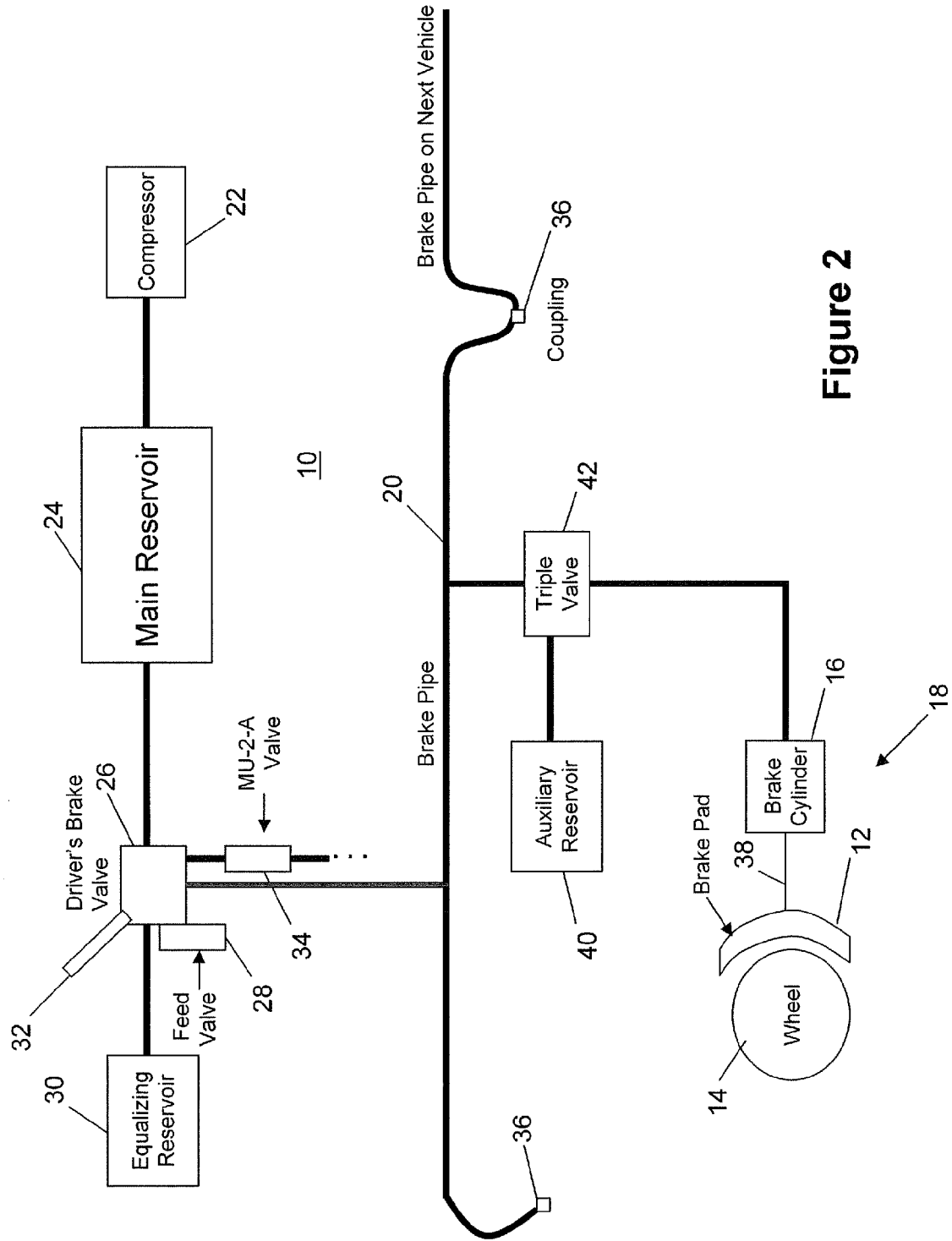
FIG. 2 is a schematic diagram of a pneumatic braking system on a locomotive.

FIG. 1 illustrates a train 2 having a lead locomotive 4 and one or more trailing locomotives 6 in a consist, and one or more trailing cars 8. Each locomotive 4, 6 and car 8, has a braking system 10 for stopping the train. Referring now to FIG. 2, as noted above, many trains 2 are equipped with pneumatic or "air" braking systems 10, which use compressed air as the force to push brake pads 12 on to wheels 14 or pads on to discs (not shown) using a brake cylinder 16, collectively referred to hereinafter as a brake 18. The compressed air is transmitted along the train 2 through a brake pipe 20. A change in the level of air pressure in the brake pipe 20 causes a change in the state of the brake 18 on each vehicle (locomotive or trailing car). The braking system 10 can be used to apply the brake 18, release the brake 18, or hold the brake 18 "on" after a partial application. Such systems 10 are well known in the rail industry.

A compressor 22 is used to draw air from the atmosphere and compress it for use on the train 2. The principle use of the compressor 22 is for the braking system 10, however, it may be noted that compressed air has various other uses on trains 2. The compressor 22 feeds a main reservoir 24, which is a storage tank for compressed air for the braking and any other pneumatic systems on the train 2. A driver's brake valve 26 is piped into the main reservoir 24 and is the mechanism by which the driver controls the brake 18. As is well known in the art, the brake valve 26 typically has at least the following positions: "release", "running", "lap", "application", and "emergency". There may also be a "shut down" position, which locks the valve 26 out of use. The release position connects the main reservoir 24 to the brake pipe 20, which raises the air pressure in the brake pipe 20 as quickly as possible to get a rapid release after the driver gets the signal to start the train 2. In the running position, a feed valve 28 is selected, which allows a slow feed to be maintained into the brake pipe 20 to counteract any small leaks or losses in the brake pipe 20, connections, and hoses. The lap position is used to shut off the connection between the main reservoir 24 and the brake pipe 20 and to close off the connection to atmosphere after a brake application has been made. The lap position is only used to provide a partial application. The application position closes off the connection from the main reservoir 24 and opens the brake pipe 20 to atmosphere. The emergency position operates similar to the application position except that the opening to atmosphere is larger to give a quicker application.

The feed valve 28 is connected between the main reservoir 24 and the brake pipe 20 when in the running position, and is used to ensure that brake pipe pressure remains at the required level. The feed valve 28 is set to a specific operating pressure. Different railways use different pressures but are typically in the range of between 65 and 90 psi. An equalizing reservoir 30 is a small pilot reservoir used to help the driver select the correct pressure in the brake pipe 20 when making an application. When an application is made, moving the brake valve handle 32 to the application position does not discharge the brake pipe directly, it lets air out of the equalizing reservoir 30. The equalizing reservoir 30 is connected to a relay valve (not shown), which detects the drop in pressure and automatically lets air escape from the brake pipe 20 until the pressure in the pipe is the same as that in the equalizing reservoir 30. The equalizing reservoir 30 overcomes the difficulties which can result from a long brake pipe 20. A long brake pipe 20 typically means that small changes in pressure selected by the driver to get a low rate of braking will not be seen on his gauge until the change in pressure has stabilized along the whole train 2. The equalizing reservoir 30 and associated relay valve allows the driver to select a brake pipe pressure without having to wait for the actual pressure to settle down along a long brake pipe 20 before an accurate reading is obtained.

An MU-2-A valve 34 is used to multiple unit the braking functions of a 26-L equipped locomotive 4, 6 with No. 6, 26, or 24-RL equipped locomotives. The MU-2-A valve 34 is located on the side of the control stand below the feed valve 28. As will be explained in greater detail below, the MU-2-A valve 34 can control whether the braking system 10 on that particular locomotive 4, 6, is controlled from that unit or controlled from another unit. It can be appreciated that the MU-2-A valve 34 is shown only illustratively in FIG. 2 so as to not obscure the basic components of the braking system 10, and further detail of the actual connections to the braking system 10 are exemplified in FIGS. 7 and 8.

The brake pipe 20 runs along the length of the train 2 and transmits the variations in pressure required to control the brake 18 on each vehicle 4, 6, 8. The brake pipe 20 is connected between vehicles by flexible hoses, which can be uncoupled to allow vehicles to be separated. The use of the air system attempts to make the brake 18 "fail safe" such that a loss of air in the brake pipe 20 will cause the brake 18 to be applied or activate. Brake pipe pressure loss can be through a number of causes such as: a controlled reduction by the driver, a rapid reduction by the driver or conductor (if applicable) using the emergency position, a rapid reduction by passengers using a passenger emergency system, a rapid reduction through a burst pipe or hose, or a rapid reduction when the hoses part as a result of the train becoming parted or derailed. The brake pipe 20 is carried between adjacent vehicles through flexible hoses connected by a coupling 36.

Each vehicle has at least one brake cylinder 16 and, sometimes, two or more are provided. The movement of a piston 38 contained in the cylinder 16 operates the brakes 18 through links called rigging. The rigging applies the brake pads 12 to the wheels 14 or in some modern systems, disc brakes are used. The piston 38 moves in accordance with the change in air pressure in the brake cylinder 16. The operation of the brake 18 on each vehicle relies on the difference in pressure between one side of a triple valve piston (not shown) and the other. In order to ensure there is always a source of air available to operate the brake 18, an auxiliary reservoir 40 is connected to one side of the piston by way of a triple valve 42. The flow of air into and out of the auxiliary reservoir 40 is controlled by the triple valve 42. The brake pad 12 comprises the frictional material which is pressed against the surface of the wheel tread by movement of the brake cylinder piston 38.

The operation of the brake 18 on each vehicle is controlled by the triple valve 42, which also has functions to release the brake 18, to apply it, and to hold it at the current level of application. The triple valve 42 contains a slide valve 44 (see FIG. 3) which detects changes in the brake pipe pressure and rearranges the connections inside the triple valve 42 accordingly. The triple valve 42 either recharges the auxiliary reservoir and opens the brake cylinder exhaust 46 (see FIG. 3), closes the brake cylinder exhaust 46 and allows the auxiliary reservoir 40 to feed air into the brake cylinder 16, or holds the air pressures in the auxiliary reservoir 40 and the brake cylinder 16 at the current level.

It can be appreciated that the pressure of the air in the train's brake pipe 20 is controlled in order to operate the braking system 20. The brake pipe 20 controls triple valves 42 on the lead locomotive 4, trailing locomotive(s) 6, and trailing cars 8 that, in turn, direct air flow to the brake cylinders 16, applying or releasing pressure between the wheels 14 and the brake blocks 12. The braking system 10 performs many functions and the primary functions for operator control are as follows.

The first function is to charge or fill the air volume reservoirs on all vehicles with pressurized air. The locomotives 4, 6, cannot load or develop power until this activity is complete. To charge the reservoirs, the brake valve handle 32 is placed in the release position, wherein the brake pipes 20, which run from the lead locomotive 4 to the very last car in the train 2, are supplied with air from the main reservoir 24 up to a predetermined pressure. This is turn actuates the appropriate valves on each vehicle such that the pressurized air is directed to the equalizing and auxiliary reservoirs 30, 40.

Figure 3:
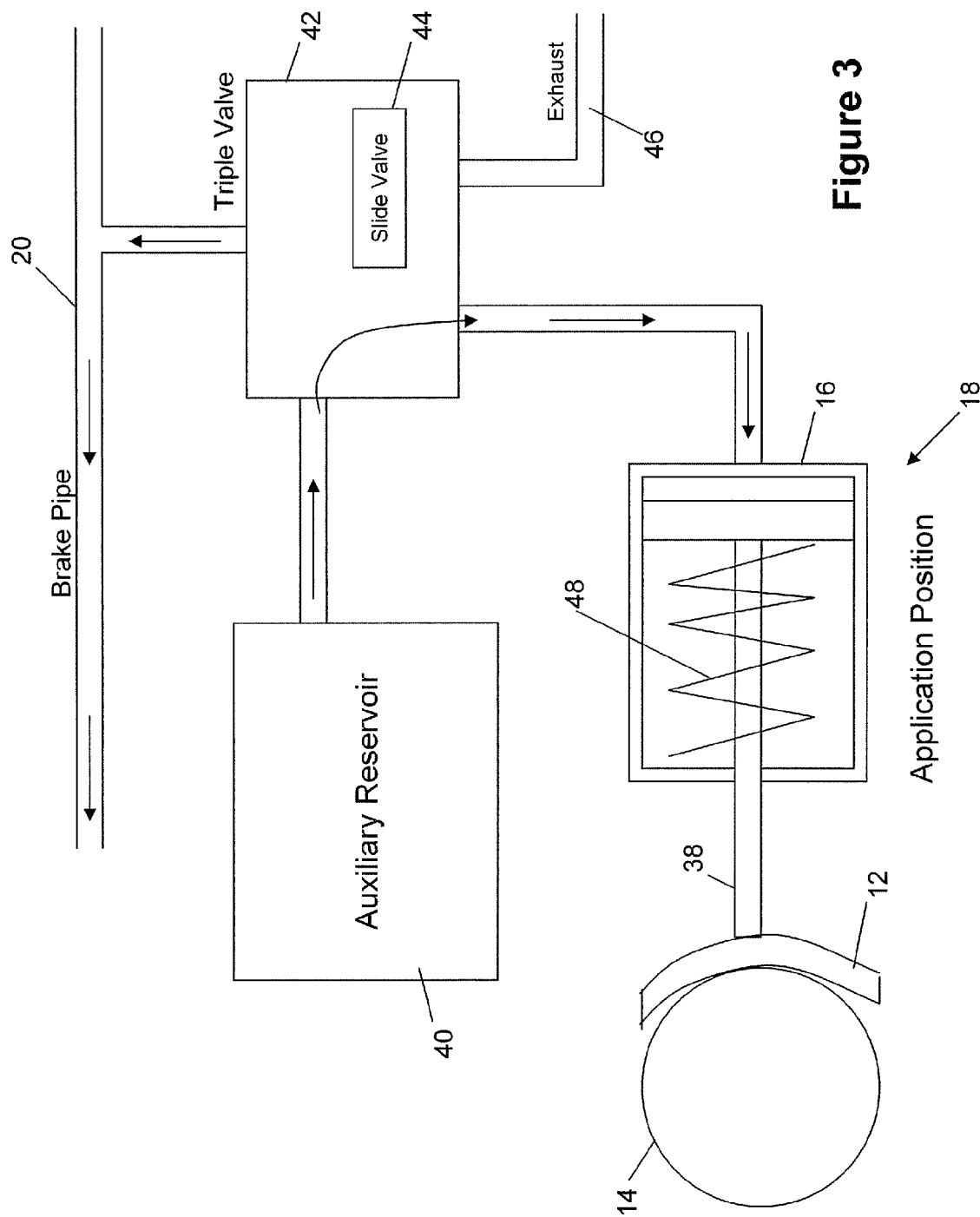
FIG. 3 is a schematic diagram of a portion of the pneumatic braking system shown in FIG. 1 in an application position.

The second function is to apply service or application to the brakes 18 as shown in FIG. 3, which is done by moving the brake valve handle 32 to the application position, releasing pressure from the equalizing reservoir 30 to control the brake pipe pressure. The brake valve 26 causes pressure from the brake pipe 20 to escape to atmosphere and the loss in pressure is detected by the slide valve 44 in the triple valve 42. Because the pressure on the one side (the brake pipe side) of the slide valve 44 has fallen, the auxiliary reservoir pressure on the other side operates the slide valve 44 such that a feed groove over the valve is closed. The connection between the brake cylinder 16 and the exhaust 46 underneath the slide valve 44 is also closed. At the same time, a connection between the auxiliary reservoir 40 and the brake cylinder 16 has been opened and, as shown in FIG. 3, air now feeds through into the brake cylinder 16. The air pressure forces the piston 38 to move against resilient pressure (e.g. via a spring 48) and causes the brake pads 12 to be applied to the wheels 14. Air will continue to pass from the auxiliary reservoir 40 to the brake cylinder 16 until the pressure in both is equal. This is the maximum pressure the brake cylinder 16 will attain, and is equivalent to a full application. To get a full application with a reasonable volume of air, the volume of the brake cylinder 16 is typically less than (e.g. 40%) of the volume of the auxiliary reservoir 40.

Figure 4:
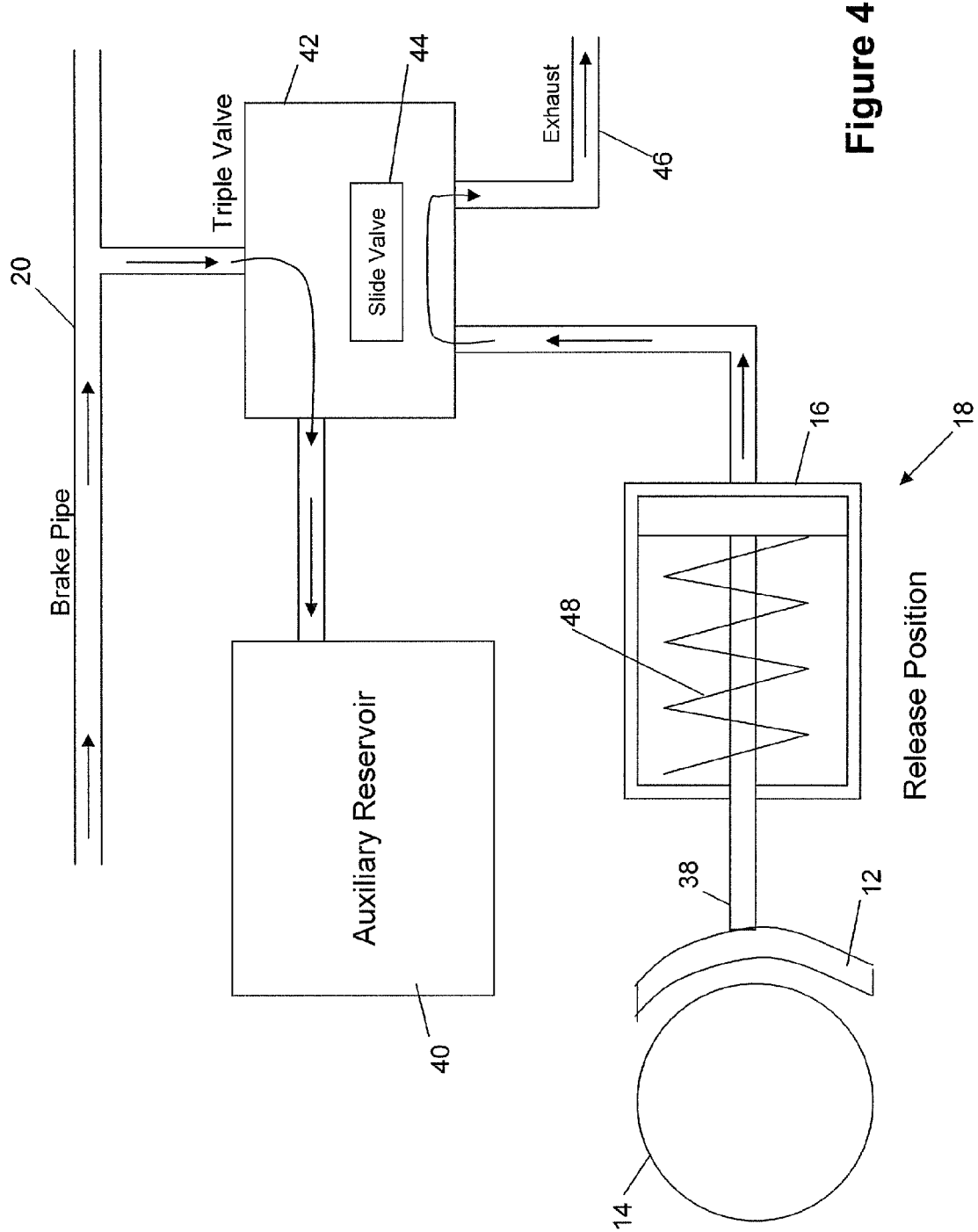
FIG. 4 is a schematic diagram of a portion of the pneumatic braking system shown in FIG. 1 in a release position.
Figure 5:
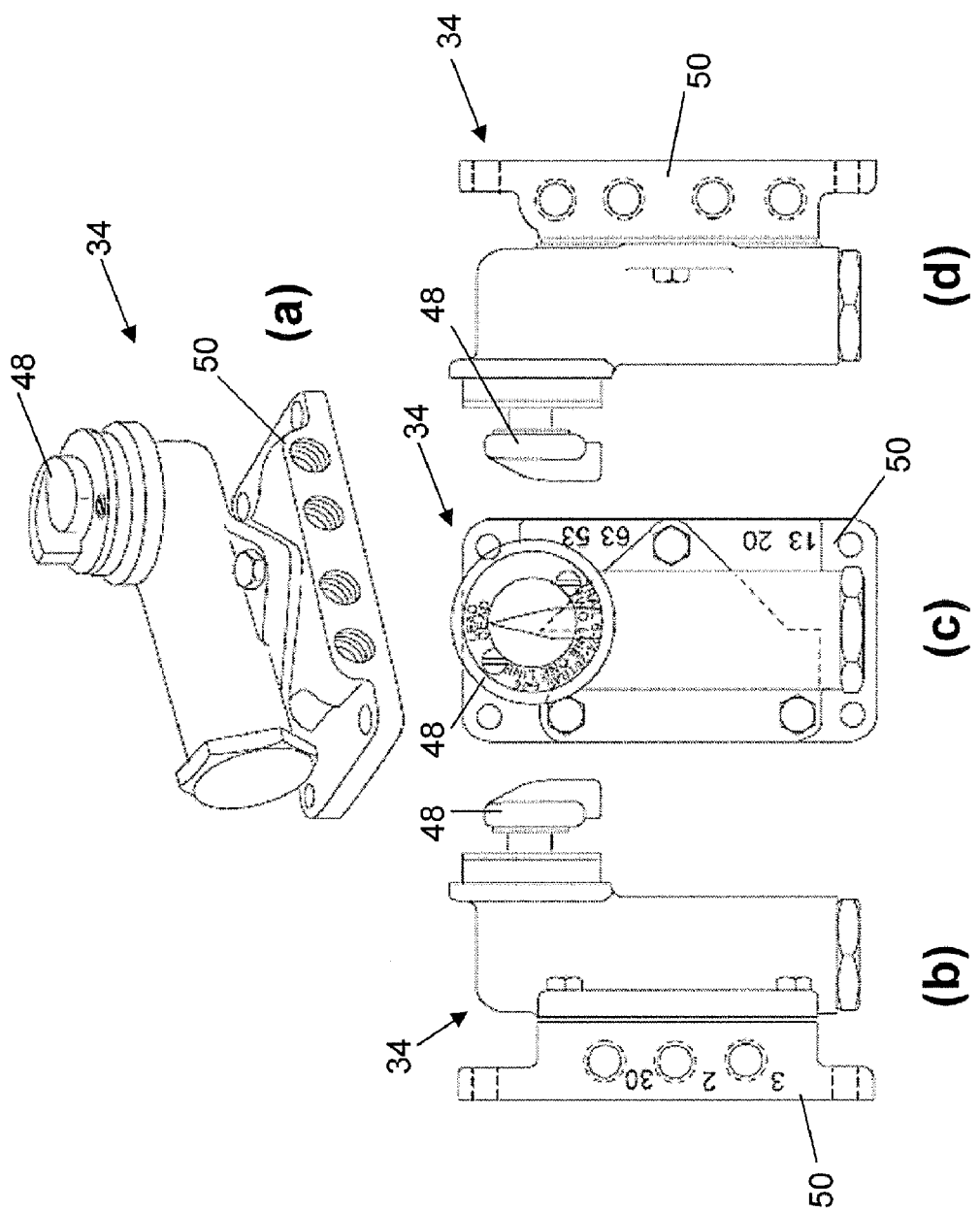
FIG. 5(a) is a perspective view of an MU-2-A valve.
FIG. 5(b) is a left profile view of an MU-2-A valve.
FIG. 5(c) is a plan view of an MU-2-A valve.
FIG. 5(d) is a right profile view of an MU-2-A valve.

Another important function, shown in FIG. 4, is to release the brakes 18. To accomplish this, the brake valve handle 32 is moved back to the release position. This causes the brake pipe 20 to fill up with pressurized air to the original charging levels. Whenever the triple valve 42 senses that the brake pipe pressure is increasing, it causes the slide valve 44 to: a) operate such that pressurized air in the brake cylinder 16 is exhausted to atmosphere (thus releasing the brakes 18); and b) divert pressurized brake pipe pressure 20 back to the auxiliary reservoir 40, ultimately completing the "charging" process again.

The brake valve handle 32 can also be used to initiate an emergency brake application. When deemed important by the operator, placing the handle 32 into the emergency position will cause the following actions to occur. The first is that emergency pressure air (versus slowly and deliberately controlled air) is released into the locomotive's brake cylinders 16. The second is that the brake pipe 20 is completely exhausted to atmosphere through a larger opening when compared to a normal application, the intent being that brake pipe pressure 20 is rapidly reduced. A rapid reduction in brake pipe pressure at the triple valve 42 in each vehicle, causes air at full emergency pressure to be directed from its respective auxiliary reservoir 40 to the brake cylinders 16. As the brake pipe pressure drops to zero, a pressure switch interlock (not shown) removes all power to the locomotive's traction motors.

It may be noted that locomotives 4, 6 equipped with vigilance or alerter equipment will operate a valve that places the locomotive 4, 6 into emergency brake application as its final action. The ultimate effect is the same as that of an operator initiated emergency brake application.

Other functions of the locomotive braking system 10 include offering the operator the ability to control the locomotive's brakes 18 independent of the rest of the train 2, and interlocking the pneumatic brakes 18 such that they do not interfere with the locomotive's dynamic (electric) braking function.

FIGS. 5(a) to 5(d) illustrate further detail concerning the MU-2-A valve 34. The braking system 10 on a locomotive 4, 6, is normally designed to be controlled by the brake valve handle 32 on that locomotive 4, 6. The MU-2-A valve 34 is a manually operated valve that works in such a way that with the selector handle 48 in the proper position, the braking system 10 of one locomotive 4, 6 can be controlled by the brake valve handle 32 operations of another locomotive 4, 6.

Figure 7:
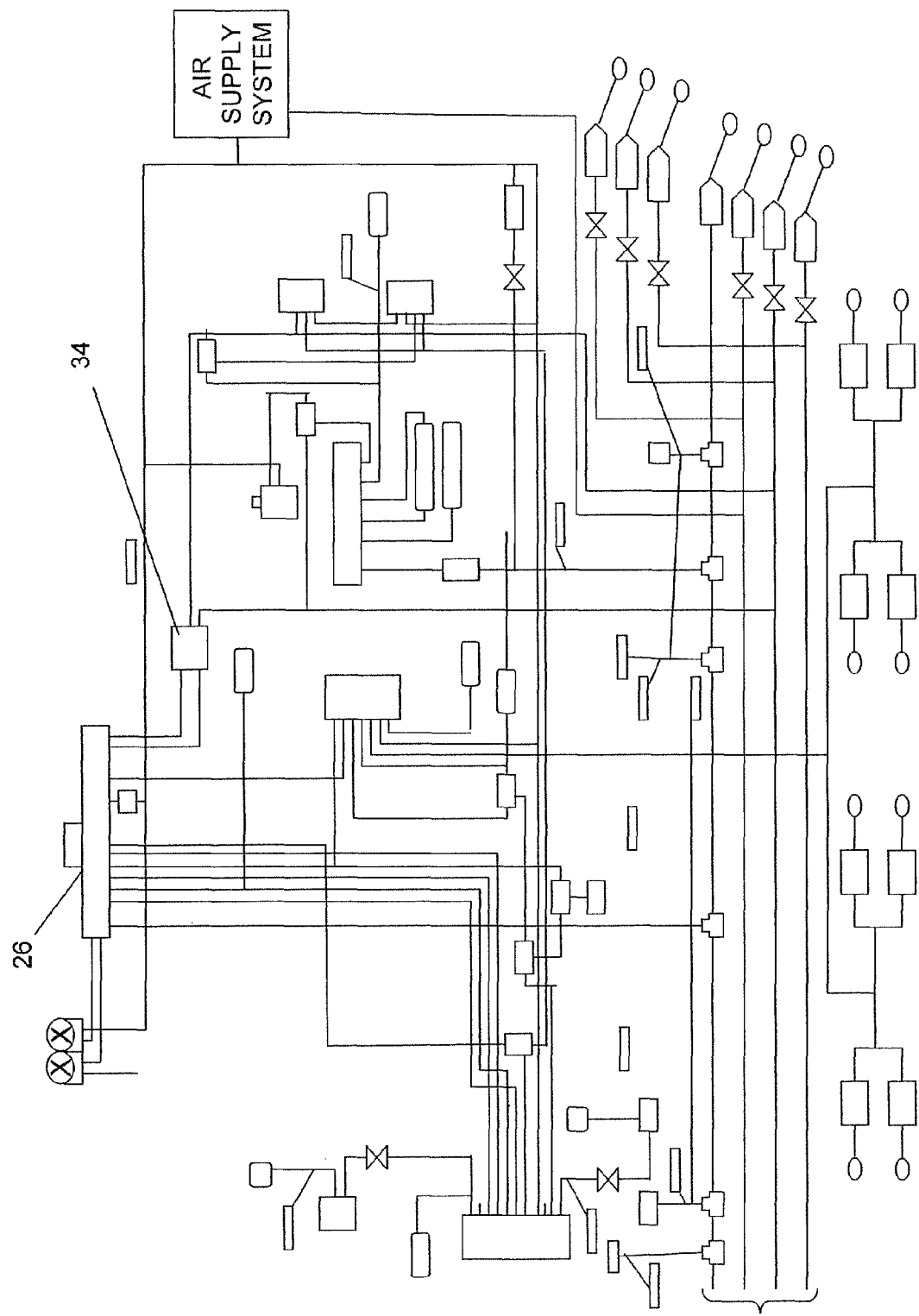
FIG. 7 is a schematic piping diagram for multiple uniting a consist of locomotives.
Figure 8:
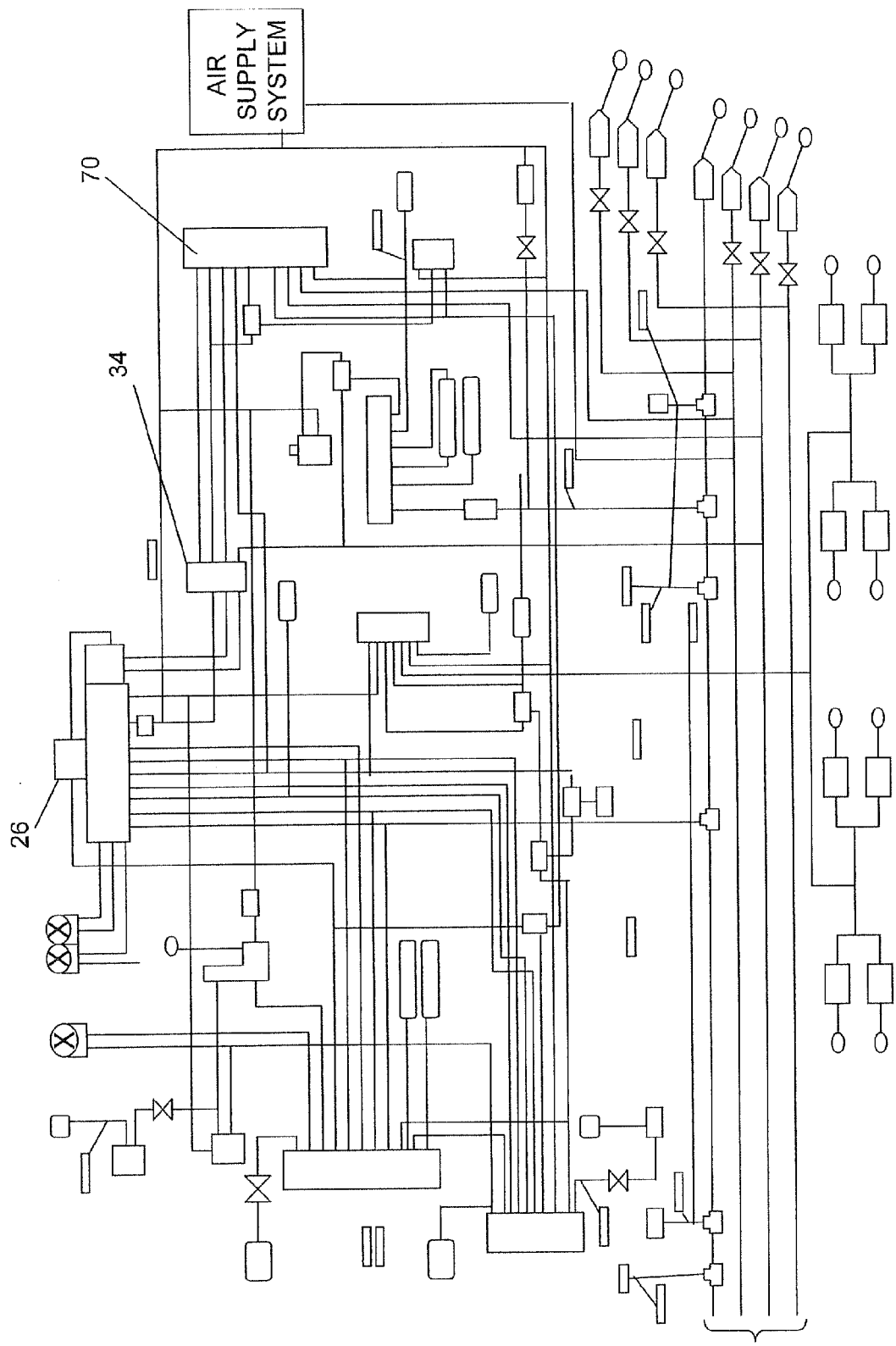
FIG. 8 is a schematic piping diagram for split reduction of safety, overspeed, and automatic train control applications with temporary and permanent suppression feature.

The MU-2-A valve 34 comprises a manifold 50 having a number of ports, numbered according to convention and specific connections, which are well known in the art, and may be referenced by referring to FIGS. 7 and 8. Port 2 connects to the independent application and release pipe, port 3 connects to the actuating pipe, port 3 connects to the independent application and release pipe, port 30 connects to the main reservoir 24, port 53 connects to the multiple unit control pipe, and port 63 connects to the multiple unit interlock pipe. Ports 53 and 63 enable the MU-2-A valve 34 to switch control of the braking system 10 between the locomotive in which it is located or another locomotive 4, 6 in a consist.

Figure 6:
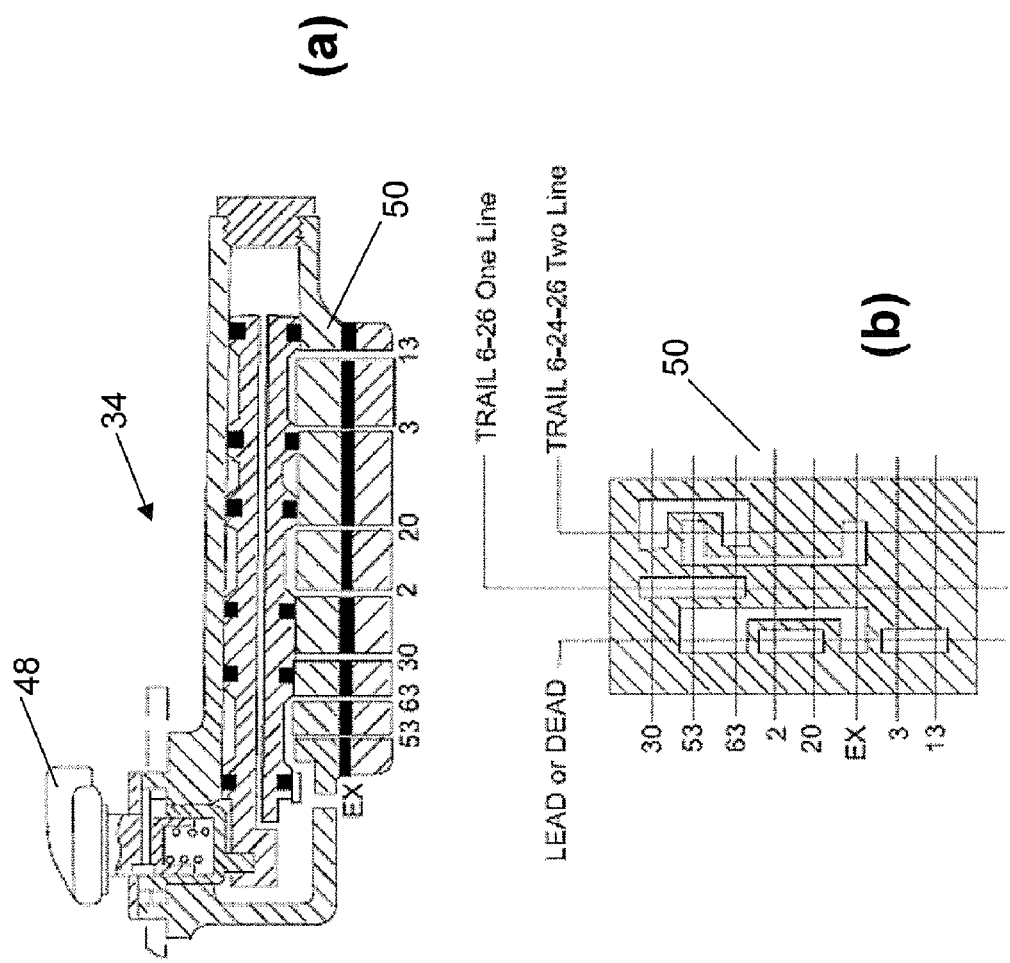
FIG. 6(a) is a cross-sectional view of an MU-2-A valve.
FIG. 6(b) is a plan view in cross-section showing port connectivity for the MU-2-A valve shown in FIG. 6(a).

The selector handle 48 can assume three positions, namely "Lead-Dead", "Trail 6-26 One Line", and "Trail 6-24-26 Two Line". The various positions can be explained by referring to the FIGS. 6(a) and (b). In the Lead-Dead position, the main reservoir air which is piped to port 30 is blocked by the spool in the MU-2-A valve 34. Ports 53 and 63 are connected to atmosphere. Independent brake control air from the independent brake valve is connected to port 2 of the MU-2-A valve 34 and thus through the spool to port 20. The actuating pipe air from the independent brake valve is connected to port 3 of the MU-2-A valve 34 and thus through the spool to port 13. When the MU-2-A valve 34 is placed in Trail 6-26 One Line position, the main reservoir air piped to port 30 of the MU-2-A valve 34 is connected to ports 53 and 63. All other connected ports are blocked at the spool valve. When the MU-2-A valve 34 is placed in Trail 6-24-26 One Line position, the main reservoir air piped to port 30 is connected via the spool valve to port 63. Port 53 is connected to atmosphere in the spool valve and all other port connections are blocked at the spool valve.

Depending on the model of the locomotive 4, 6, and the generation of braking equipment, the MU-2-A valve 34 may work in conjunction with another valve, the F-1 selector valve as shown in FIG. 8 or without as shown in FIG. 7. If the MU-2-A valve 34 is connected to the F-1 selector valve, e.g. as shown in FIG. 8, then in the trail position, port 30, as noted above, will be directed to either port 63 or to port 63 and port 53, which are both directly plumbed to the F-1 valve. The determination of whether both port 63 and 53 are connected to the main reservoir air or only port 63, is based on the model of the braking system the lead (controlling) locomotive 4 is equipped with and is determined by the operator. This is evident from the two trail positions available on the MU-2-A valve 34.

As noted above, when the MU-2-A valve 34 on the locomotive 4, 6 is returned to the lead position, port 63 and port 53 are exhausted to ambient pressure and thus there is a distinct difference in pressure on port 63 between trailing and leading positions. In particular, it has been recognized that since in either trailing position, the pressure at port 63 is substantially if not exactly equal to the main reservoir air pressure, a determination of the pressure at port 63 can indicate whether or not the locomotive 4, 6 is in trail or lead position. The determination can be based on a pressure measurement and comparison of such a reading to knowledge of what the pressure reading should be in the trail or lead position; or, as will be exemplified below, by activating a pressure switch having particular set points that indicates which position the MU-2-A valve 34 is in.

If the locomotive 4, 6 is in lead position, the pressure at port 63 would be exhausted to atmosphere and thus read 0 PSI. If the locomotive 4, 6 is in trail position, port 63 would be close to or equal to the significantly higher main reservoir air pressure at port 30, which should always be kept above 100 PSI, and is generally kept at 135 PSI. As such, it has been found that a pressure switch or equivalent pressure measurement device within a relatively broad range of set points and with a standard hysteresis can be used in fluid communication with the port 63, to determine if that port is connected to either main reservoir pressure or to atmosphere, thus indicating, according to the above, whether the locomotive 4, 6 is in trail or lead position. It will be appreciated that a pressuring reading may instead be taken at port 63, which can be compared to previous knowledge of what the pressure at the main reservoir 24 would be; or can, instead, be compared to a reading taken directly from plumbing to the main reservoir 24 itself. As noted above, port 63 typically reads either 0 PSI or a value close to the main reservoir pressure depending on whether the locomotive 4, 6 is in trailing or leading position, which enables knowledge of only the pressure at port 63 to make a confident determination, e.g. through a pressure switch or a single pressure measurement.

Figure 9:
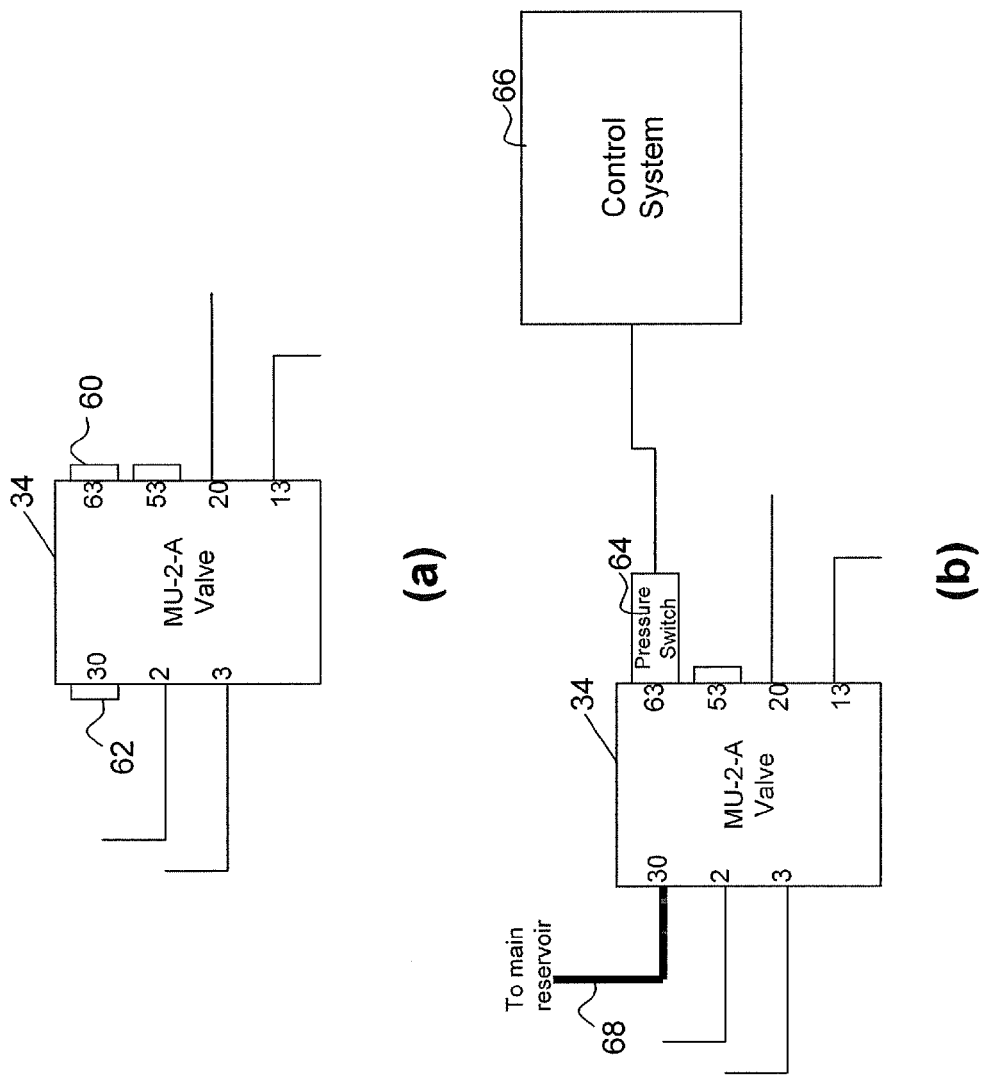
FIGS. 9(a) and 9(b) are schematic diagrams illustrating incorporation of a pressure switch into a locomotive utilizing an MU-2-A valve without an F-1 valve.
Figure 10:
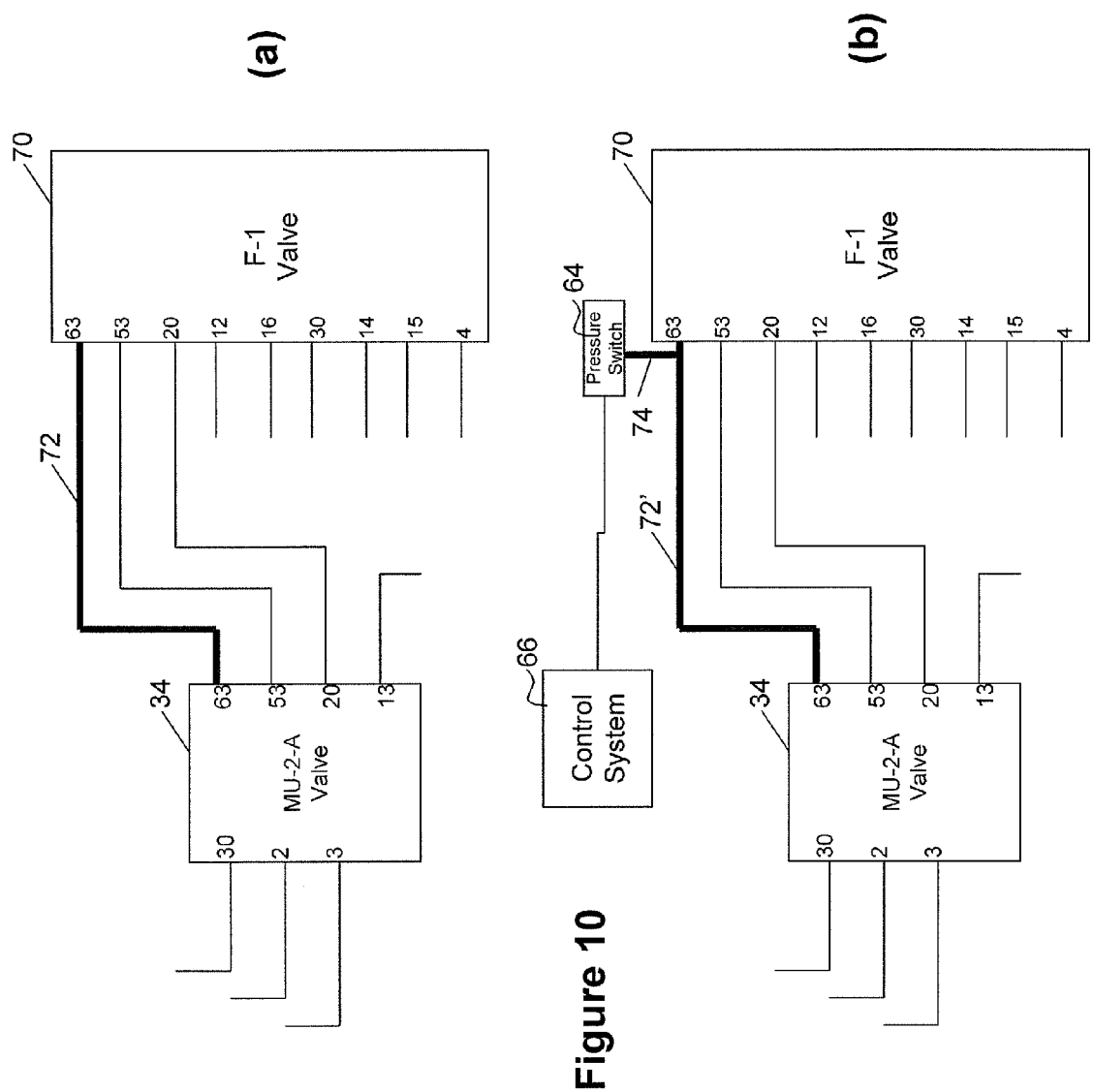
FIGS. 10(a) and 10(b) are schematic diagrams illustrating incorporation of a pressure switch into a locomotive utilizing an MU-2-A valve and an F-1 valve.

Turning now to FIGS. 9 and 10, as noted above, the MU-2-A valve 34 may be plumbed to an F-1 valve 70 or not. FIGS. 9(*a*) and 9(*b*) illustrate an example configuration for determining the trailing or leading position through the MU-2-A valve 34, wherein the MU-2-A valve 34 is not plumbed into an F-1 valve 70. The MU-2-A valve 34 before alteration is shown in FIG. 9(*a*). It can be seen that when not connected to an F-1 valve 70, ports 30, 63 and 53 are capped or plugged. In this case a first plug 60 is connected to port 63 and a second plug 62 is connected to port 30. The first plug 60 is removed from port 63 and, as shown in FIG. 9(*b*), is replaced with a pressure switch 64. The second plug 62 is also removed and a pipe 68 is run from a convenient source of main reservoir pressure to port 30. Such a source can be found in many areas of the locomotive control stand. Since the pipe 68 is providing a pressure signal for the pressure switch 64 and thus not providing any significant air flow, the pipe 68 can be of a small diameter such as ¼". The pressure switch 64 should be able to withstand main reservoir air pressure and potential air hammer (shocks) associated with the main reservoir 24. The pressure switch 64 in this embodiment is configured to turn "ON" when the pressure exceeds a specified set point (e.g. 50 PSI) and turn "OFF" when it drops below a normal pressure switch threshold determined by its hysteresis (e.g. 45 PSI). It may be noted that because of the ON/OFF condition of the pressure and its range of over 100 PSI, a wide variety of pressure switch set points can suffice in this application.

The pressure switch 64 will typically activate a set of dry contacts. As shown in FIG. 9(*b*), any control system 66 can access these contacts to determine their status and thus the locomotive's lead/trail status. The status can then be used accordingly. For example, the lead/trail status can be utilized by a locomotive Automatic Engine Shutdown and Start control system.

Turning now to FIG. 10(*a*), a typical configuration is shown wherein the MU-2-A valve 34 is connected to the F-1 valve 70. In this configuration, port 63 is connected to the F-1 valve 70 with a pipe 72. Typically, the pipe 72 will be copper, but may be made of another material. In order to determine the lead/trail status, the pressure in the pipe 72 needs to be accessed by the pressure switch 64. There are several ways of accomplishing this. For example, as shown in FIG. 10(*b*), the pipe 72 can be modified (i.e. to become 72' as shown) by removing the pipe 72 from either the F-1 valve 70 or the MU-2-A valve 34 connection, placing a "T" junction 74 at the port and reconnecting the pipe 72'. The T junction 74 would then be routed to the pressure switch 64. The pressure switch 64 would then be connected to the control system 66 as above. In another embodiment, a portion of the pipe 72 can be removed in an accessible spot and the T junction 74 spliced into the pipe 72 thus allowing the pressure switch 64 to be plumbed to port 63.

Figure 11:
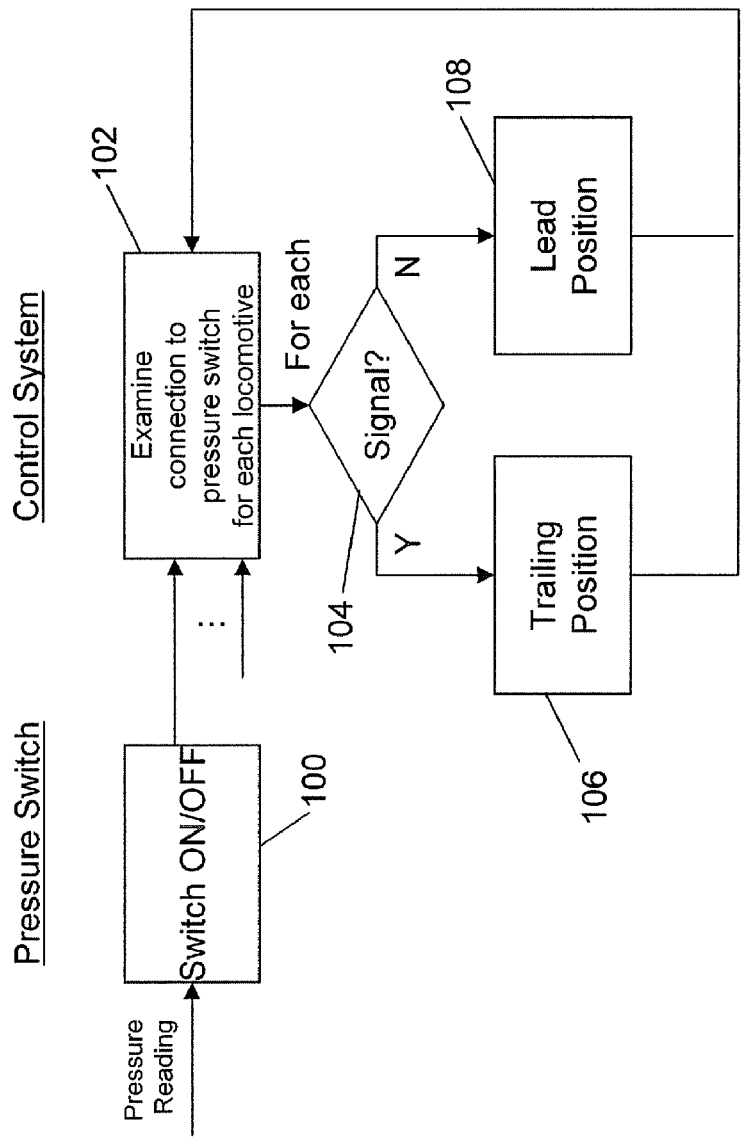
FIG. 11 is a flow chart illustrating an example set of computer executable operations for determining if a locomotive in a consist is in trailing mode or leading mode.

Turning now to FIG. 11, a flow chart illustrating an exemplary set of operations for determining the trail/lead status using the configuration in either FIG. 9 or FIG. 10. At 100, an ON/OFF status is determined or provided by the pressure switch 64 based on a pressure reading. As shown, an indication of the ON/OFF status may be provided to, e.g. the control system 66 for each locomotive 4, 6 in the train. At 102, the connections to the pressure switches 64 are examined to determine their readings, i.e. ON or OFF. For each locomotive 4, 6, at 104, the control system 66 may then determine if the appropriate signal is found. In this example, "ON" indicates that port 63 is at or around the main reservoir pressure and "OFF" indicates that it is at atmosphere. It can be appreciated that the ON/OFF status correlation can be reversed. In this example, if the ON signal is found, at 106 the control system 66 determines, for that locomotive 4, 6, that it is in the trailing position. If the OFF signal is determined, e.g. no signal found, the control system 66 determines at 108 that the locomotive 4, 6 is instead in the lead position.

It can be appreciated that, as noted above, using a pressure switch 64 is only one way of determining lead/trail status using port 63. For example, a pressure sensor (not shown) could be connected to port 63 or the pipe 72 and a pressure measurement taken. This pressure measurement could then be fed to the control system 66 or other circuitry to determine if the pressure measurement is above or below the threshold. Alternatively a second pressure sensor could be placed in fluid communication with the main reservoir 24 or plumbing connected thereto. In such a case the two pressure measurements can be compared to determine if port 63 is experiencing the main reservoir pressure. As such, any indication of the pressure at port 63 can be used in any appropriate manner to detect, determine, or otherwise alert another system, module or even the operator of the lead/trail status.

Figure 12:
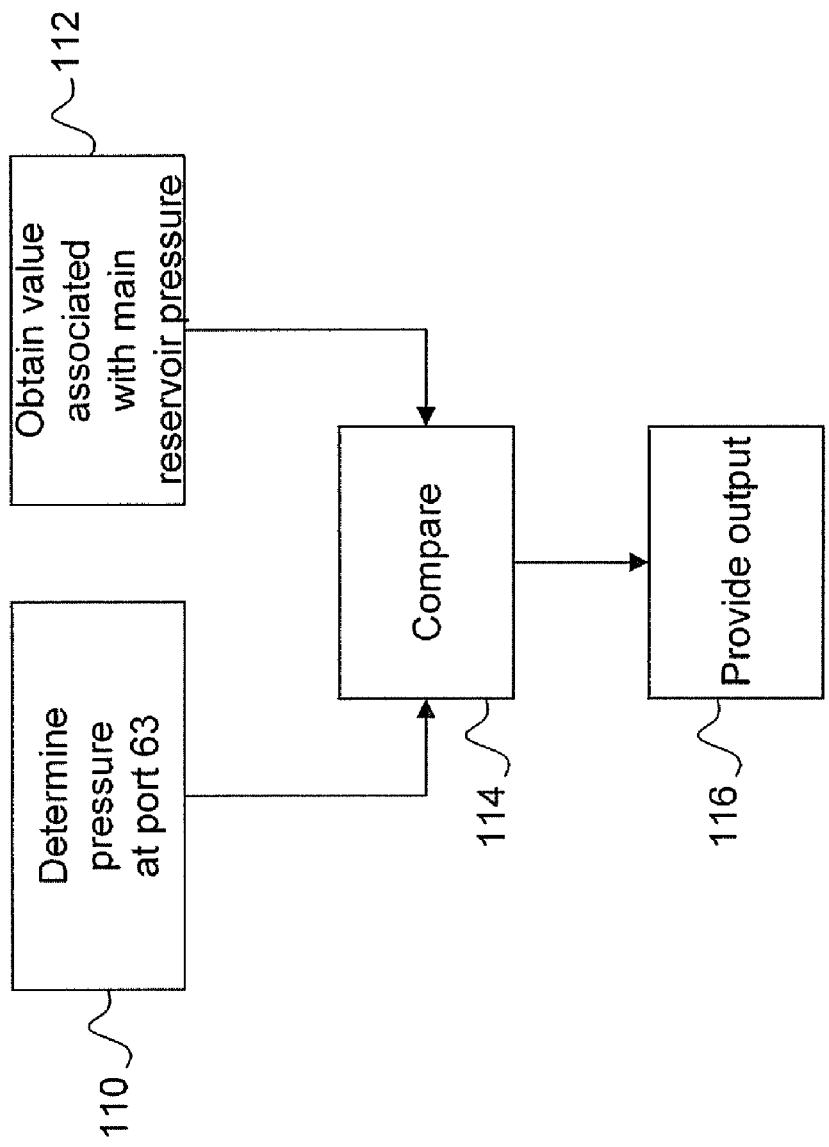
FIG. 12 is a flow chart illustrating another example set of computer executable operations for determining if a locomotive in a consist is in trailing mode or leading mode.

Turning to FIG. 12, in view of the above configurations, a method for determining whether a locomotive is in a leading mode or trailing mode may comprise, in general, obtaining or determining a first pressure measurement indicative of pressure at port 63 of the MU-2-A valve of the locomotive at 110, and comparing the first pressure measurement at 114 to a value associated with the main reservoir pressure, which can be obtained at 112. The comparison thus enables an output to be provided which is indicative of whether the locomotive is in the leading mode or the trailing mode. It can be appreciated that the pressure at port 63 can be determined using a pressure switch, pressure sensor or in general any device that is capable of taking a pressure measurement and processing or operating on that pressure measurement to either provide an output to some other device, perform a comparison itself, or both.

It can be appreciated that the above principles can also be applied to a method for retrofitting an existing locomotive in order to determine whether that locomotive is in a leading mode or a trailing mode.

It can also be appreciated that the above principles can also be applied to any other locomotive component that can provide a measurable attribute such as a pressure measurement indicative of whether the locomotive is in the leading mode or trailing mode, for example, where an MU-2-A valve is not used.

Although the above principles have been described with reference to certain specific embodiments, various modifications thereof will be apparent to those skilled in the art without departing from the scope of the claims appended hereto.

The invention claimed is:

1. A system for determining whether a locomotive in a consist is in a leading mode or a trailing mode, the system comprising:
    a first fluidly communicative connection to port 63 of an MU-2-A valve on the locomotive;
    a pressure measurement device in communication with the first fluidly communicative connection for obtaining a pressure measurement at the port 63, wherein a comparison of the pressure measurement at the port 63 to a value associated with a main reservoir pressure is indicative of whether the locomotive is in the leading mode or the trailing mode.

2. The system according to claim 1, wherein the pressure measurement device is configured to perform the comparison.

3. The system according to claim 2, wherein the pressure measurement device comprises a pressure switch connected to the port 63, the pressure switch providing as an output, either one signal for indicating that the locomotive is in the leading mode or another signal for indicating that the locomotive is in the trailing mode.

4. The system according to claim 3, further comprising a second fluidly communicative connection between port 30 of MU-2-A valve and a main reservoir, wherein the value is obtained by measuring a current pressure via the second fluidly communicative connection.

5. The system according to claim 1, further comprising an interface for providing the pressure measurement at the port 63 to enable performance of the comparison.

6. The system according to claim 5, wherein the interface provides the pressure measurement at the port 63 to an existing control system in the locomotive.

7. The system according to claim 6, wherein the comparison is performed by the control system.

8. The system according to claim 1, wherein the pressure measurement device comprises a first pressure sensor for obtaining the pressure measurement at the port 63.

9. The system according to claim 8, wherein the value associated with the main reservoir pressure is a known value, and wherein the measurement obtained by the first pressure sensor is compared to the known value in determining the output.

10. The system according to claim 8, wherein the value associated with the main reservoir pressure is obtained via a second pressure sensor in fluid communication with the main reservoir, and wherein the measurement obtained by the first pressure sensor is compared to a measurement taken by the second pressure sensor in determining the output.

11. The system according to claim 1, wherein the first fluidly communicative connection interfaces with an existing connection between the port 63 on the MU-2-A valve and an existing F-1 Valve of the locomotive.

12. The system according to claim 11, wherein the pressure measurement device comprises a pressure switch connected to the first fluidly communicative connection, the pressure switch providing as an output, either one signal for indicating that the locomotive is in the leading mode or another signal for indicating that the locomotive is in the trailing mode.

13. A method for determining whether a locomotive in a consist is in a leading mode or a trailing mode, the method comprising:
    obtaining a first pressure measurement indicative of pressure at port 63 on an MU-2-A valve of the locomotive;
    comparing the first pressure measurement to a value associated with the main reservoir pressure; and
    using the comparison to provide an output indicative of whether the locomotive is in the leading mode or the trailing mode.

14. The method according to claim 13, wherein if the first pressure measurement meets a predetermined threshold, the output is indicative of one of the modes, and wherein if the first pressure measurement does not meet the predetermined threshold, the output is indicative of the other of the modes.

15. The method according to claim 14, wherein if the first pressure measurement is within a predetermined range of values associated with the main reservoir pressure, the output indicates that the locomotive is in the trailing position.

16. The method according to claim 13, further comprising obtaining a second pressure measurement indicative of the value associated with the main reservoir pressure.

17. The method according to claim 13, wherein the method is performed by an existing control system on the locomotive.

18. A method for retrofitting an existing locomotive configured to be used in a consist for determining whether the locomotive is in a leading mode or a trailing mode, the method comprising:
    providing a first fluidly communicative connection to port 63 of an MU-2-A valve on the locomotive;
    providing a pressure measurement device in communication with the first fluidly communicative connection for obtaining a pressure measurement at the port 63; and
    obtaining an output provided by the pressure measurement device indicative of the pressure measurement at the port 63 to enable comparison of the pressure measurement to a value associated with a main reservoir pressure.

19. The method according to claim 18, wherein the pressure measurement device comprises a pressure switch connected to the port 63, the method further comprising providing either one signal for indicating that the locomotive is in the leading mode or another signal for indicating that the locomotive is in the trailing mode.

20. The method according to claim 18, further comprising providing a second fluidly communicative connection between port 30 of MU-2-A valve and a main reservoir, wherein the value is obtained by measuring a current pressure via the second fluidly communicative connection.

21. The method according to claim 18, further comprising providing the output to an existing control system in the locomotive.

22. The method according to claim 18, wherein the value associated with the main reservoir pressure is a known value, and wherein the method further comprises comparing the output to the known value in performance of the comparison.

* * * * *